(12) United States Patent
Diaz et al.

(10) Patent No.: US 7,150,596 B2
(45) Date of Patent: Dec. 19, 2006

(54) TOGGLE BOLT DEVICE

(76) Inventors: Carroll Diaz, 464 W. 47th St., Cut Off, LA (US) 70345; Derrick Prentice, 1300 Bayou Black Dr., Houma, LA (US) 70360

( * ) Notice: Subject to any disclaimer, the term of this patent is extended or adjusted under 35 U.S.C. 154(b) by 0 days.

(21) Appl. No.: 10/896,756

(22) Filed: Jul. 22, 2004

(65) Prior Publication Data

US 2005/0201847 A1    Sep. 15, 2005

Related U.S. Application Data

(63) Continuation-in-part of application No. 10/071,786, filed on Feb. 7, 2002, now Pat. No. 7,077,610.

(51) Int. Cl.
*F16B 21/00* (2006.01)
(52) U.S. Cl. ............ 411/344; 411/21; 411/349; 411/348; 411/354; 411/355; 411/549; 411/551; 411/552; 411/553
(58) Field of Classification Search ............... 411/21, 411/349, 348, 354, 355, 549, 551, 552, 553; 269/43, 49
See application file for complete search history.

(56) References Cited

U.S. PATENT DOCUMENTS

| | | | | |
|---|---|---|---|---|
| 499,444 A | * | 6/1893 | Schumann | 411/344 |
| 1,169,635 A | * | 1/1916 | Grimes | 411/344 |
| 1,247,621 A | * | 11/1917 | Bennett | 411/26 |
| 1,520,123 A | * | 12/1924 | Gillen | 411/344 |
| 2,597,857 A | * | 5/1952 | Francis | 411/344 |
| 2,782,672 A | * | 2/1957 | Davis | 411/355 |
| 2,877,818 A | * | 3/1959 | Johnson | 411/107 |
| 3,238,834 A | * | 3/1966 | Appleberry | 411/347 |
| 3,312,138 A | * | 4/1967 | Cumming | 411/21 |
| 3,466,965 A | * | 9/1969 | McCarthy | 411/342 |
| 3,946,636 A | | 3/1976 | Grey | |
| 4,047,462 A | | 9/1977 | Hurtig | |
| 4,079,655 A | | 3/1978 | Roberson, Jr. | |
| 4,293,259 A | * | 10/1981 | Liebig | 411/32 |
| 4,294,570 A | * | 10/1981 | Meschnig | 411/103 |
| 4,453,845 A | | 6/1984 | Donan, Jr. | |
| 4,557,631 A | | 12/1985 | Donan, Jr. et al. | |
| 4,693,389 A | * | 9/1987 | Kalen | 220/236 |
| 5,108,240 A | | 4/1992 | Liebig | |
| 5,573,495 A | * | 11/1996 | Adler | 600/204 |
| 5,702,215 A | * | 12/1997 | Li | 411/21 |
| 5,865,559 A | | 2/1999 | Yang | |
| 6,056,489 A | * | 5/2000 | Keller | 411/21 |
| 6,161,999 A | | 12/2000 | Kaye et al. | |
| 6,203,260 B1 | | 3/2001 | Henline et al. | |

FOREIGN PATENT DOCUMENTS

| | | |
|---|---|---|
| DE | 1092415 | 7/1956 |
| DE | 1936360 | 7/1969 |
| FR | 1236439 | 9/1959 |

* cited by examiner

*Primary Examiner*—Robert J. Sandy
*Assistant Examiner*—David Reese
(74) *Attorney, Agent, or Firm*—Garvey, Smith, Nehrbass & North, L.L.C.; Charles C. Garvey, Jr.

(57) ABSTRACT

A fastener apparatus is disclosed that features projecting locking members that extend and retract when a central drive shaft is rotated. The exterior of the connector has a body that is partially threaded to receive a nut so that two structures (eg. flanges, panels, plates, beams, etc.) can be pulled together by tightening the bolt when the locking members are in the extended position. In one embodiment, the shaft can be an eyebolt.

44 Claims, 15 Drawing Sheets

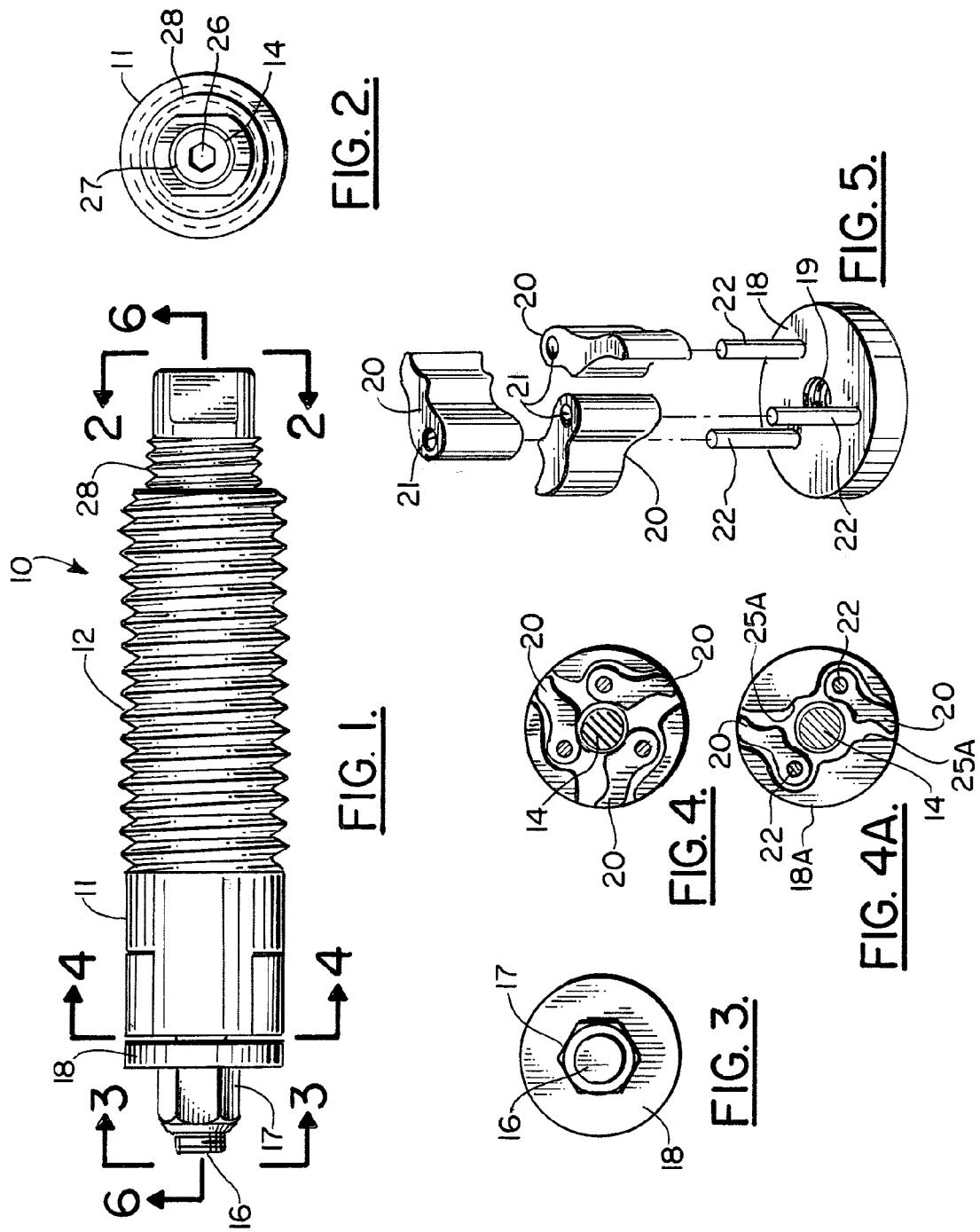

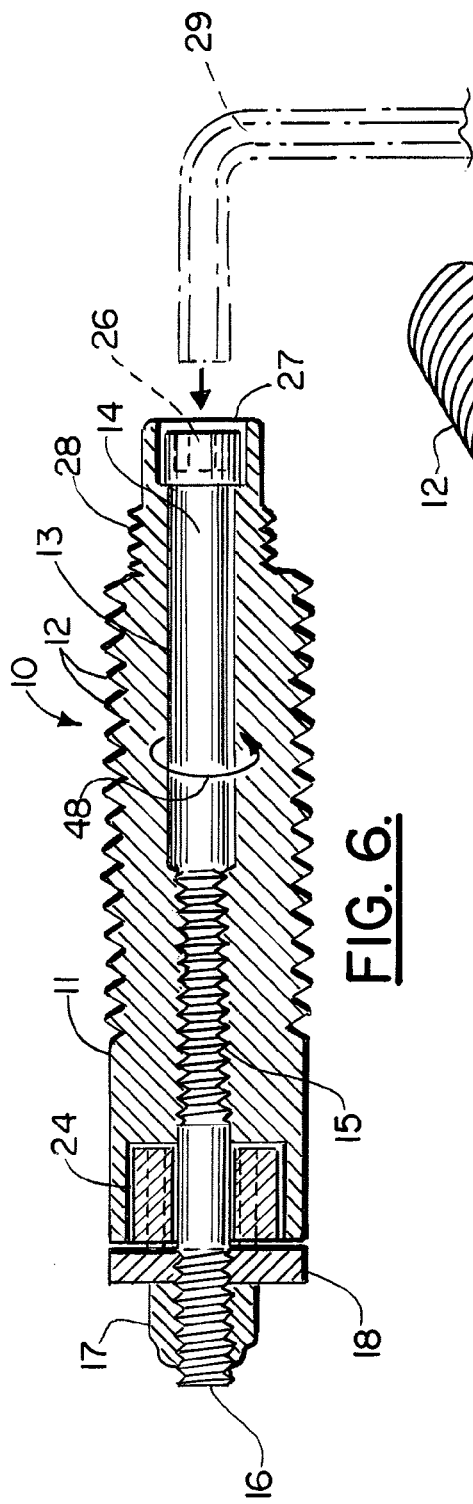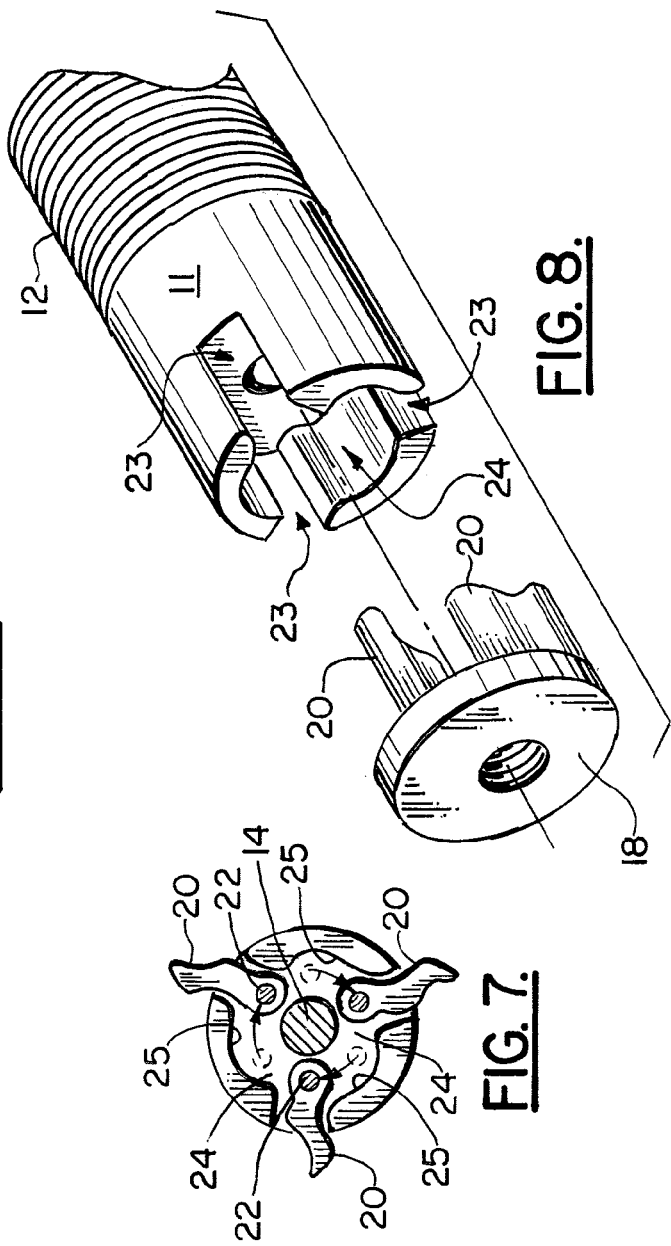

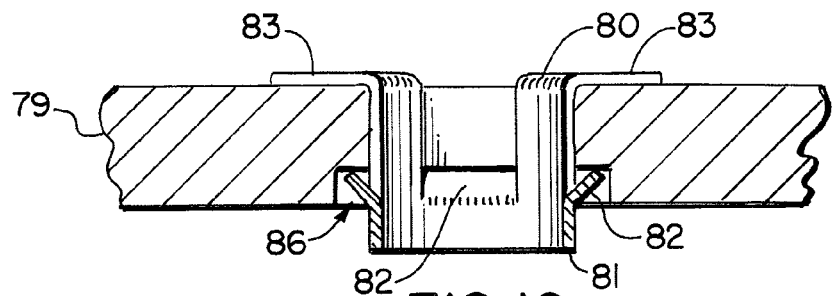
FIG. 16.
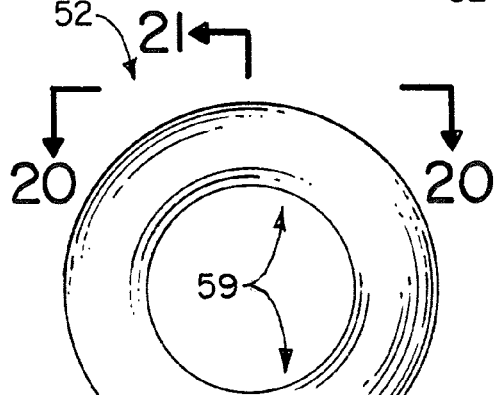
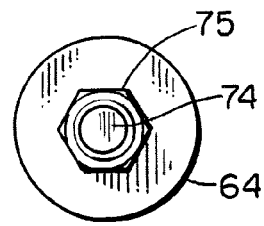
FIG. 18.
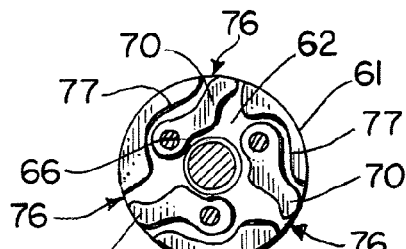
FIG. 19.
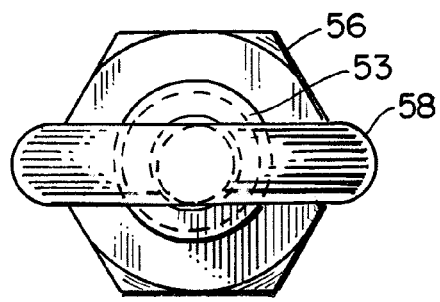
FIG. 20.
FIG. 17.

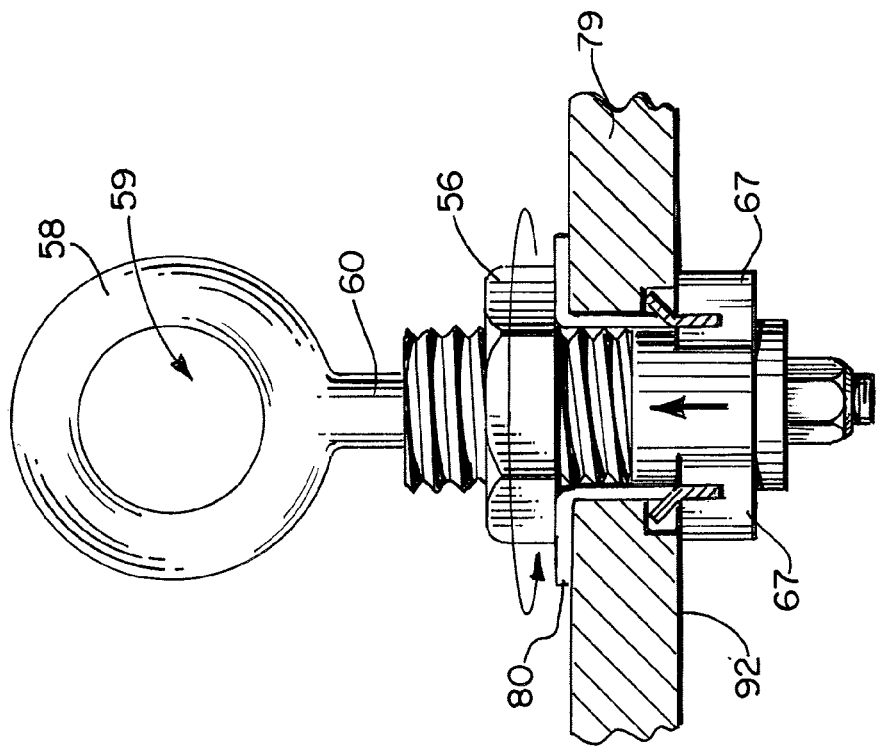
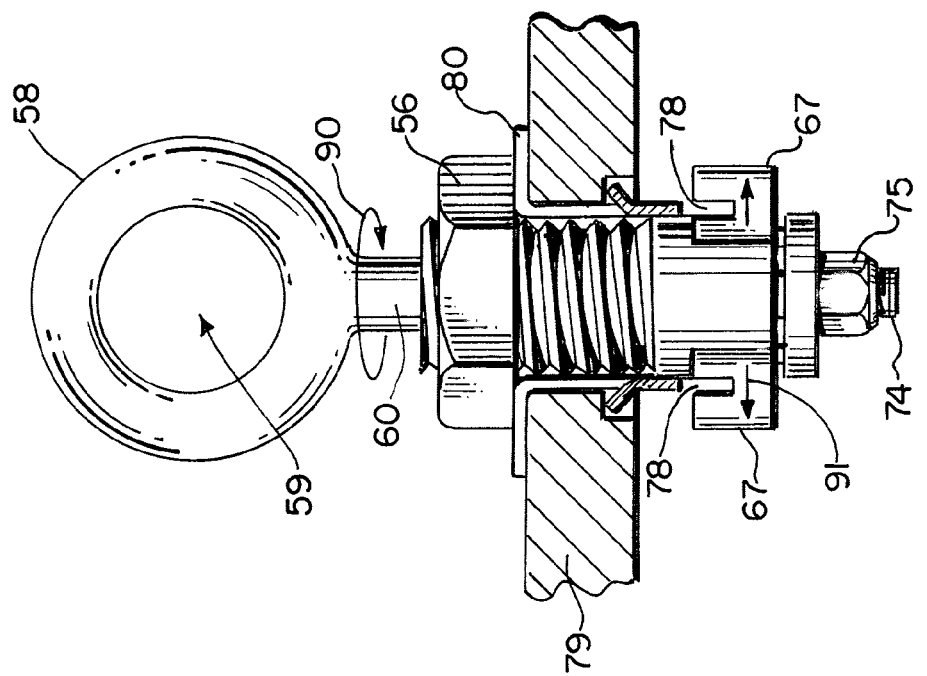

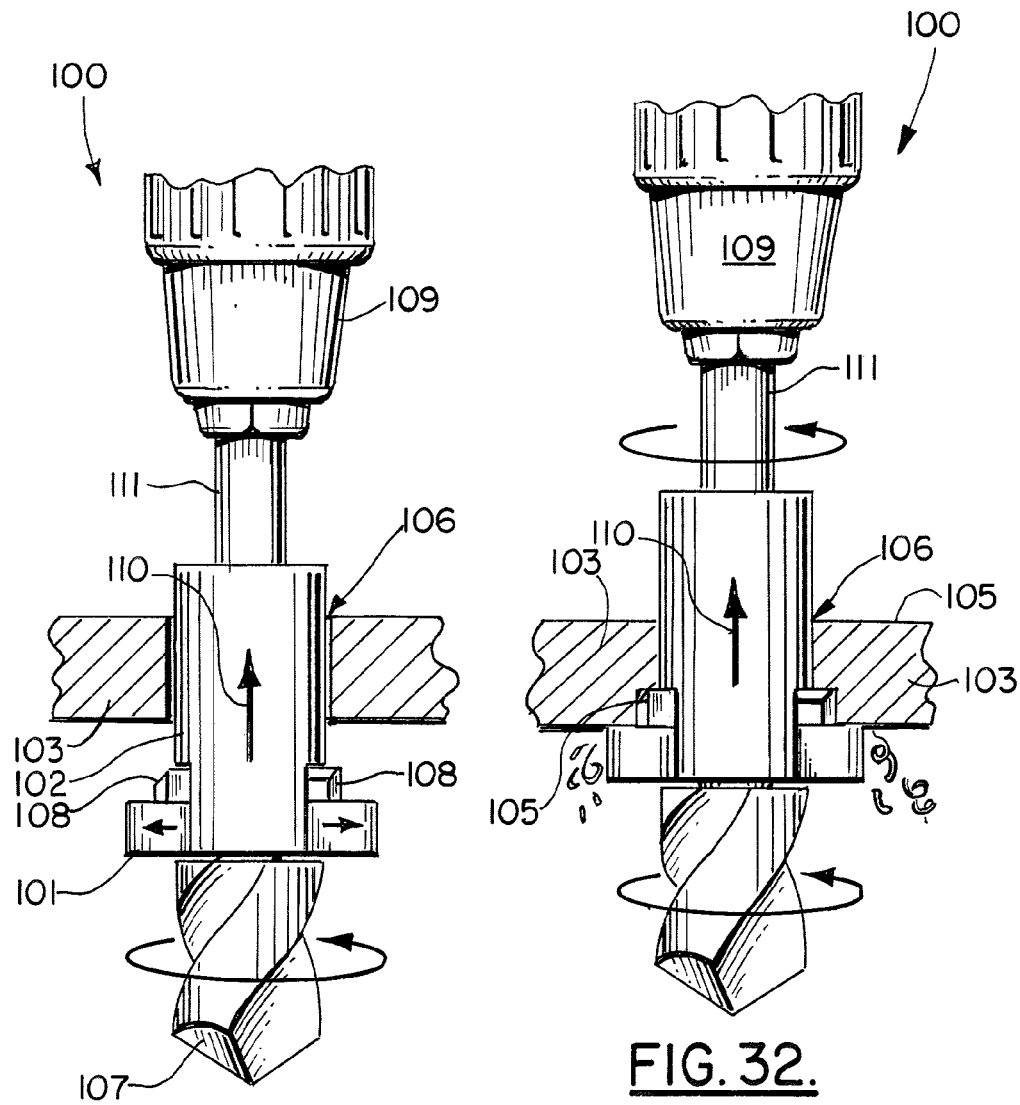
FIG. 31.
FIG. 32.
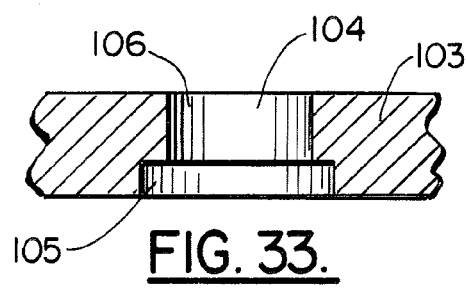
FIG. 33.

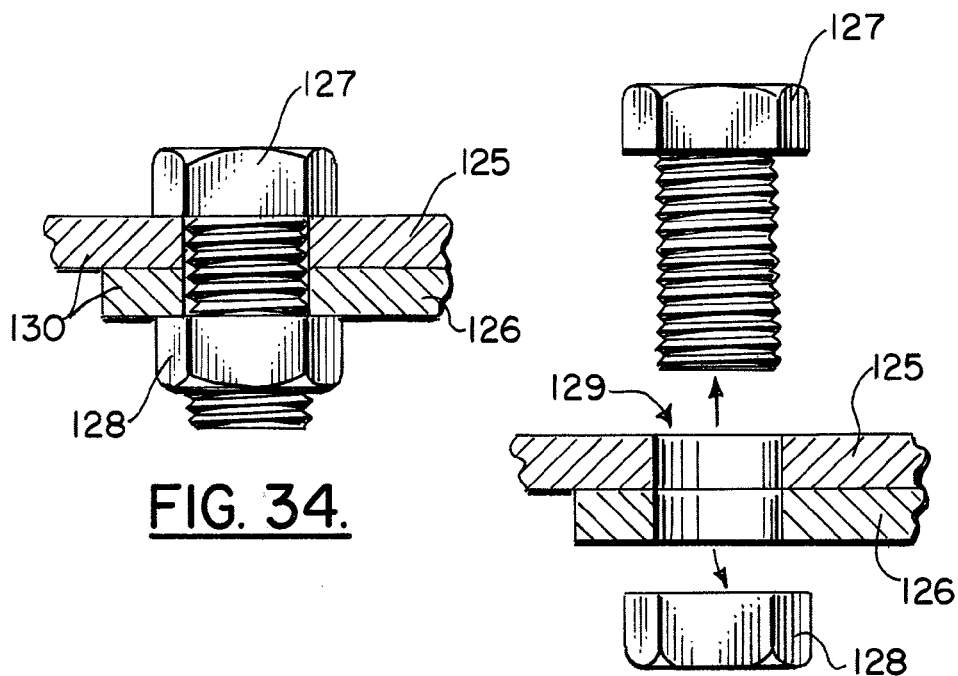
FIG. 34.
FIG. 35.
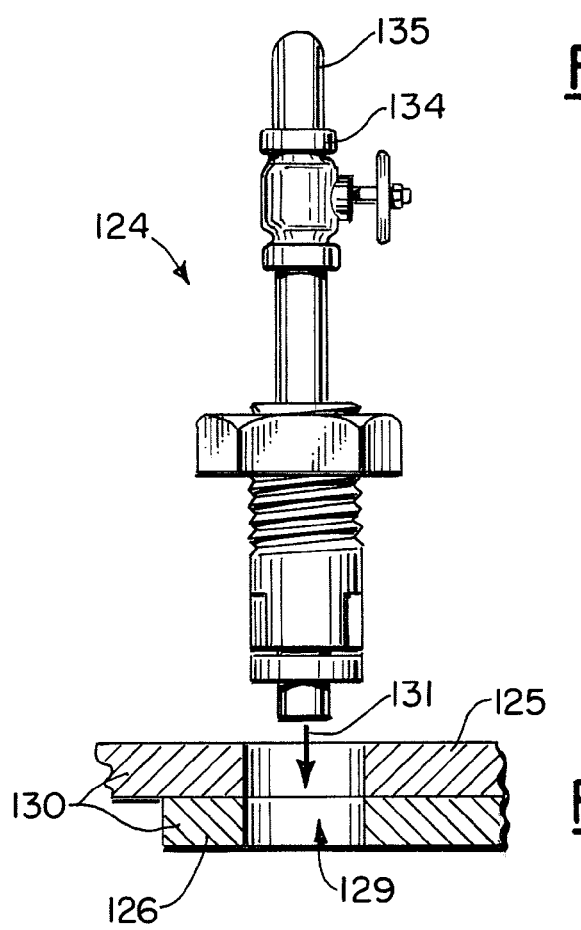
FIG. 36.

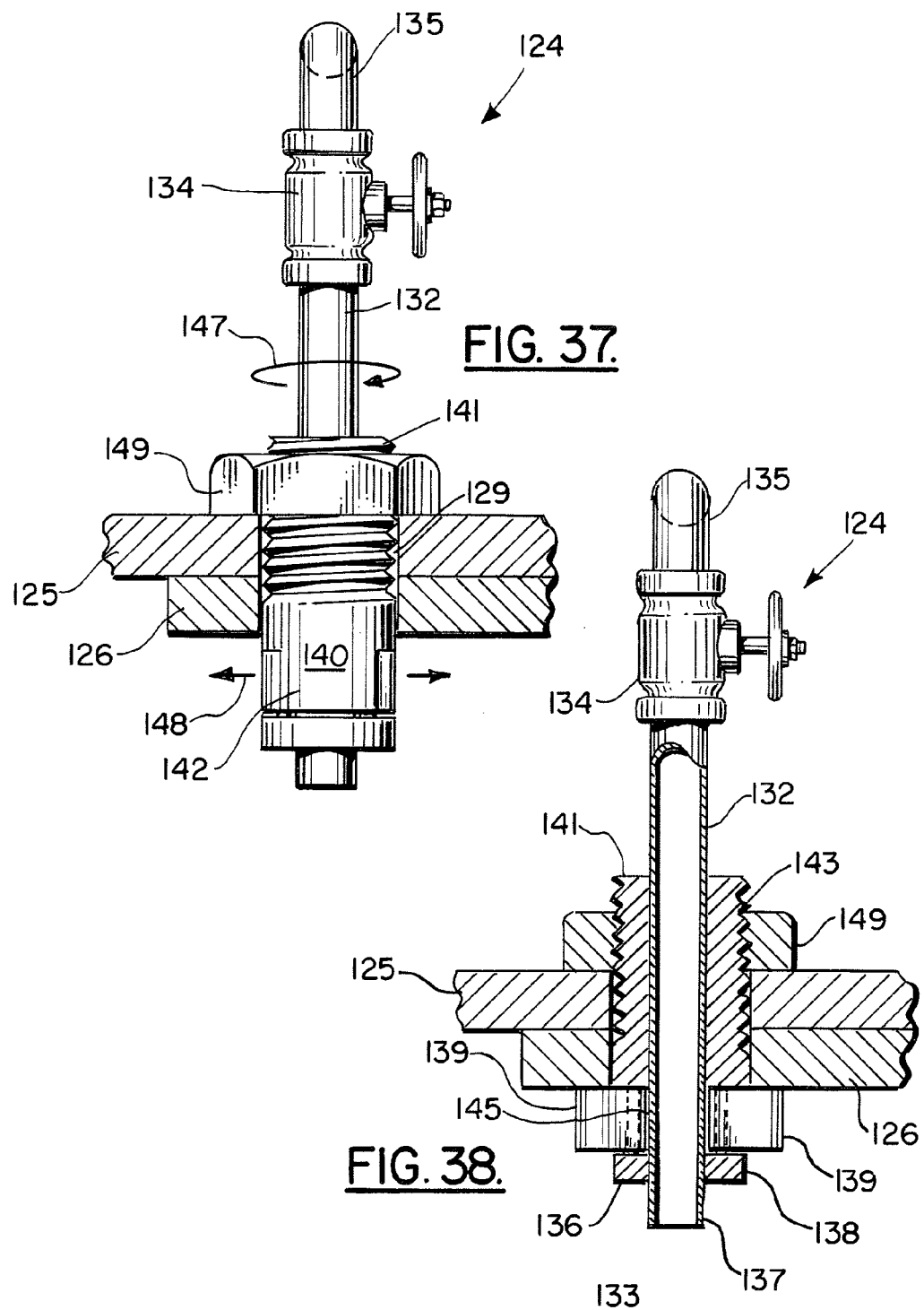

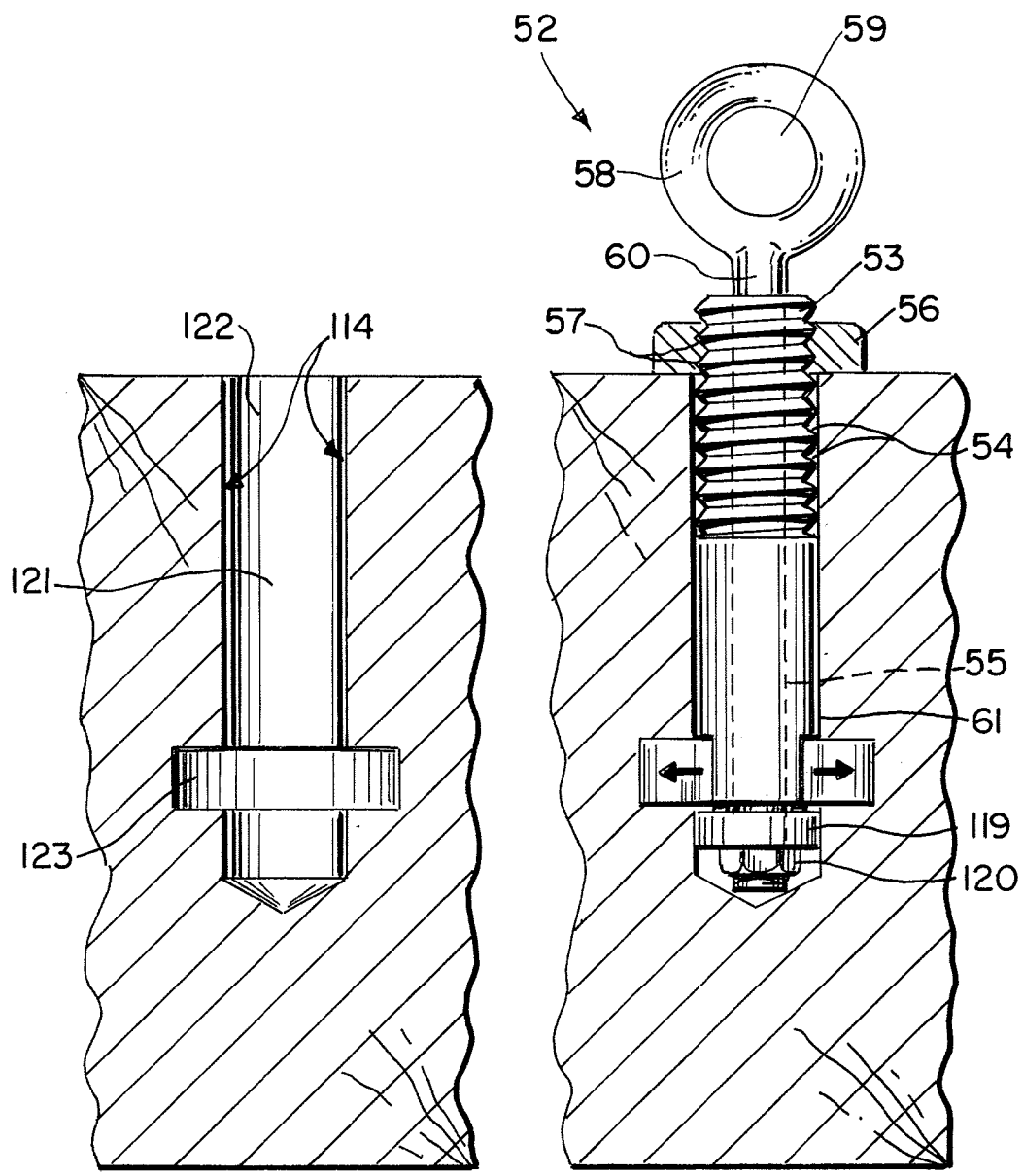

TOGGLE BOLT DEVICE

CROSS-REFERENCE TO RELATED APPLICATIONS

This is a continuation in part of U.S. Ser. No. 10/071,786 filed Feb. 7, 2002 now U.S. Pat. No. 7,077,610 and entitled "Toggle Bolt Device". Priority is claimed to provisional application No. 60/590,186 filed Jul. 22, 2004 and application No. 60/590,187 filed Jul. 22, 2004 each incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to fasteners. More particularly, the present invention relates to a toggle bolt type fastener that can be used for holding or compressing multiple items together such as structural panels, flanges, or the like. Even more particularly, the present invention relates to an improved fastener device that features an outer body with an inner rotating shaft, rotation of the shaft moving a plurality of locking members between extended and retracted positions or between retracted and extended positions.

2. General Background of the Invention

Many types of fasteners have been patented that are designed to extend through multiple panels or wall members or through a single wall member. Such fasteners are designed to form a connection between multiple panels or between opposing sides of a particular panel or wall. Many of these fasteners are known as toggle bolts. Examples of patents disclosing toggle bolts and related fasteners are listed in the following table.

The following U.S. Patents are incorporated herein by reference:

TABLE

| PATENT NO. | TITLE | ISSUE DATE |
|---|---|---|
| 1,169,635 | Pipe Hanger | Jan. 25, 1916 |
| 3,312138 | Expansion Shell for Rock Bolts | Apr. 04, 1967 |
| 3,946,636 | Toggle Bolt | Mar. 30, 1976 |
| 4,047,462 | Toggle Bolt | Sep. 13, 1977 |
| 4,079,655 | Toggle Bolt | Mar. 21, 1978 |
| 4,453,845 | Base Thrust Anchor Shell Assembly | Jun. 12, 1984 |
| 4,557,631 | Off-Center Rock Bolt Anchor and Method | Dec. 10, 1985 |
| 5,108,240 | Heavy Load Bearing Toggle Bolt | Apr. 28, 1992 |
| 5,865,559 | Float Pins | Feb. 02, 1999 |
| 6,161,999 | Toggle Bolt Device | Dec. 19, 2000 |
| 6,203,260 | Toggle Bolt Assembly With Bolt Centering Spacer | Mar. 20, 2001 |
| FR1236,439 | Dispositif de soutenement par bil-broche notamment pour plafonds de galeries de mines | Jun. 07, 1960 |
| DE1092415 | Anke fur den Ankerausbau | Nov. 10, 1960 |
| DE1936360 | | May 1970 |

BRIEF SUMMARY OF THE INVENTION

The present invention provides an improved toggle bolt type device or fastener that can be used to join two members together such as a pair of panels, structures, flanges or the like. For example, the present invention can be used to join two spool pieces with pipe flanges together (see FIG. 13) wherein each of the flanges has an opening of a selected diameter. The fastener of the present invention can extend through the openings for holding or fastening the two flanges together.

The apparatus includes an elongated body having first and second end portions and a central, longitudinal bore that is partially threaded. A first end portion of the body has a socket and a plurality of circumferentially spaced apart, radially extending slots that communicate with the socket.

A shaft extends through the bore of the body and has respective first and second end portions that communicate with the body end portion. The shaft is partially externally threaded and rotates relative to the body. The partially externally threaded portion of the shaft engages an internally threaded portion of the body at the bore.

A plurality of locking members are attached to the shaft at a first end portion of the body. The locking members can be attached to a plate mounted to the first end portion of the shaft.

The locking members are movable between extended and retracted positions responsive to a rotation of the shaft. Rotating the shaft in either of two selected direction can either move the locking members from an extended to a retracted position or from a retracted to an extended position.

In the locking position, the locking members extend radially beyond the outer surface of the body and the selected diameter. This enables the projecting, locking members in the extended position to engage one side of a selected member or members to be held together (wall, panels, flanges, etc). A fastener such as a nut is then connectable to the body at a partially externally threaded portion and opposite the locking members. The nut can then be tightened against the locking members so that compression can be applied to the shaft for holding the selected structures, flanges, panels together or for attaching the apparatus to a selected structure (wall, flange, beam, etc).

The apparatus of the present invention can be used to form an attachment to a wall, panel, beam, plate, slab or other structure by inserting the body through an opening in the selected structure when the locking members are retracted and then moving the locking members to an extended position so that they can form an attachment to the selected structure at one end portion of the opening (see FIGS. 9–11). At the opposite end portion of the opening, the nut can be attached to the body and threadably engaged thereto for supplying compression to the body and for holding and anchoring the entire apparatus into a selected position at the opening (see FIGS. 11 and 13).

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a side view of the preferred embodiment of the apparatus of the present invention;

FIG. 2 is an end view taken along lines 2—2 of FIG. 1;

FIG. 3 is an end view taken along lines 3—3 of FIG. 1;

FIGS. 4–4A are sectional views taken along lines 4—4 of FIG. 1;

FIG. 5 is a partial, perspective, exploded view of the preferred embodiment of the apparatus of the present invention;

FIG. 6 is a sectional view taken along lines 6—6 of FIG. 1;

FIG. 7 is a partial sectional view of the preferred embodiment of the apparatus of the present invention;

FIG. 8 is a partial perspective view of the preferred embodiment of the apparatus of the present invention;

FIG. 16 is a sectional view illustrating the insert attached to a selected aperatured surface;

FIG. 17 is an elevation view of an alternate embodiment of the apparatus of the present invention;

FIG. 18 is an end view taken along lines 18—18 of FIG. 17;

FIG. 19 is a sectional view taken along lines 19—19 of FIG. 17;

FIG. 20 is an end view taken along lines 20—20 of FIG. 17;

FIG. 24 is a partial sectional elevation view of the alternate embodiment of the apparatus of the present invention;

FIG. 25 is a partial sectional elevation view of the alternate embodiment of the apparatus of the present invention;

FIG. 31 is an elevation view illustrating installation of the embodiment of FIGS. 29–30;

FIG. 32 is an elevation view illustrating installation of the embodiment of FIGS. 29–30;

FIG. 33 is a sectional view illustrating the opening formed in a section of base material using the method and apparatus of FIG. 29–32;

FIG. 34 is a partial sectional, elevation view of yet another embodiment of the apparatus of the present invention;

FIG. 35 is a partial sectional, elevation view of yet another embodiment of the apparatus of the present invention;

FIG. 36 is a partial sectional elevation view illustrating yet another embodiment of the apparatus of the present invention;

FIG. 37 is a sectional view illustrating yet another embodiment of the apparatus of the present invention;

FIG. 38 is a partial sectional elevation view illustrating yet another embodiment of the apparatus of the present invention;

FIG. 41 is a sectional elevation view illustrating the opening formed using the embodiment of FIGS. 39–40;

FIG. 42 is a sectional elevation view illustrating installation of the alternate embodiment in the opening formed in FIGS. 39–41.

DETAILED DESCRIPTION OF THE INVENTION

Figure 9:
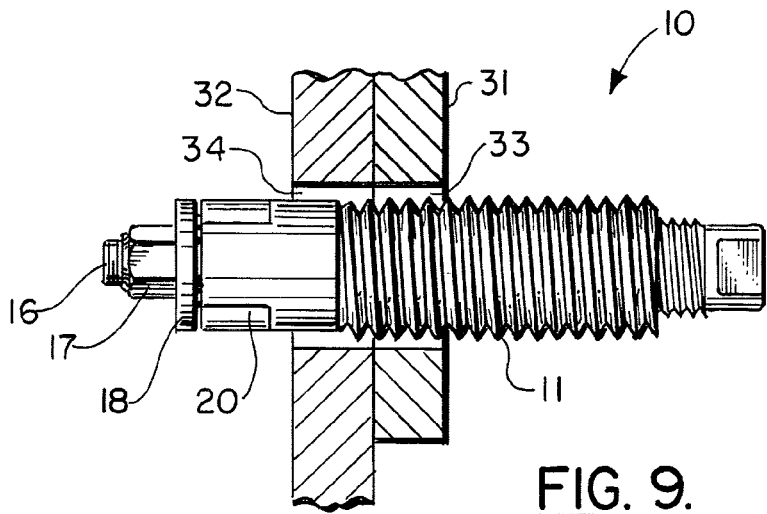
FIGS. 9–11 are sectional elevation views of the preferred embodiment of the apparatus of the present invention showing a sequence of attachment to a pair of panels, each having an opening, the openings being aligned.

FIGS. 1–11 show the preferred embodiment of the apparatus of the present invention designated generally by the numeral 11 in FIGS. 1 and 9–11. Fastener apparatus 10 includes a body 11 that has external threads 12 and a central longitudinal bore 13. The external threads 12 can be provided of a first diameter along a majority of the length of the body 11. A second threaded portion 28 is of a smaller diameter than the threaded portion 12 as shown in FIG. 1. As will be described hereinafter, an extension 35 can attach at threads 28.

A shaft 14 is mounted in the central longitudinal bore 13 of body 11. Shaft 14 has external threads 15 that engage internal threads of central longitudinal bore 13. In this fashion, when the shaft 14 is rotated, it also moves a slight distance linearly because of the engagement of the external threads 15 of shaft 14 and the internal threads of body 11 at central longitudinal bore 13. This threaded engagement functions as a stop in one (clockwise) direction.

Shaft 14 has a threaded end portion 16 that receives locking nut 17. The opposite end portion of shaft 14 provides end portion 27 having a tool receptive socket 26.

A circular plate 18 is shown in FIGS. 1–5 having a plurality of pegs 22 and a central internally threaded opening 19. A plurality of locking members 20 are mounted respectively on the plurality of pegs 22 as shown in FIGS. 3–5. Each locking member 20 has a pivot hole 21 that enables the locking member to be pivotally mounted upon a peg 22. In FIG. 4, the rotating plate 18 can be provided with three locking members 20. In FIG. 4A, the plate 18A can be provided with two pegs 22 and two locking members 20 as shown.

Body 11 has a socket 24 at one end portion thereof and a plurality of slots 23 that communicate with socket 24 as shown in FIG. 8. The socket 24 is receptive of the locking members 20 when they are in the retracted position of FIGS. 1, 4, 4A and 6. When the locking members 20 are moved to an extended position as shown in FIG. 7, the locking members 20 extend through slots 23 as shown in FIG. 7. In FIG. 8, the slots 23 extend radially and are circumferentially spaced as shown.

A wrench 29 (see FIGS. 6 and 9–11) can be used to move the locking members 20 between the retracted position of FIGS. 1, 4, 4A and 6 to the extended position of FIG. 7. The wrench 29 can, for example, be an alien wrench that fits a hexagonal socket or other like tool receptive socket 26 at end portion 27 of shaft 14. By rotating the wrench 29 in the direction of arrow 48 in FIG. 6 (counterclockwise) the shaft 14 engages the threaded portion of body 11 with its own threads 15, rotating plate 18 and pegs 22. A camming surface 25 on body 11 at socket 24 combined with the curved shape of each of the locking members 20 causes the locking members to move to the extended position of FIG. 7 when shaft 14 is rotated counter clockwise relative to body 11.

During use, the apparatus 10 is first placed in the retracted position of FIGS. 1, 6, 4, 4–8 and 9 and then inserted through a selected opening such as the aligned openings 33, 34 as shown in FIG. 9. First member 31 can have an opening 33. Similarly, second member 32 can have an opening 34 so that the fastener of the present invention can be used to hold the first member 31 and second member 32 together.

Figure 10:
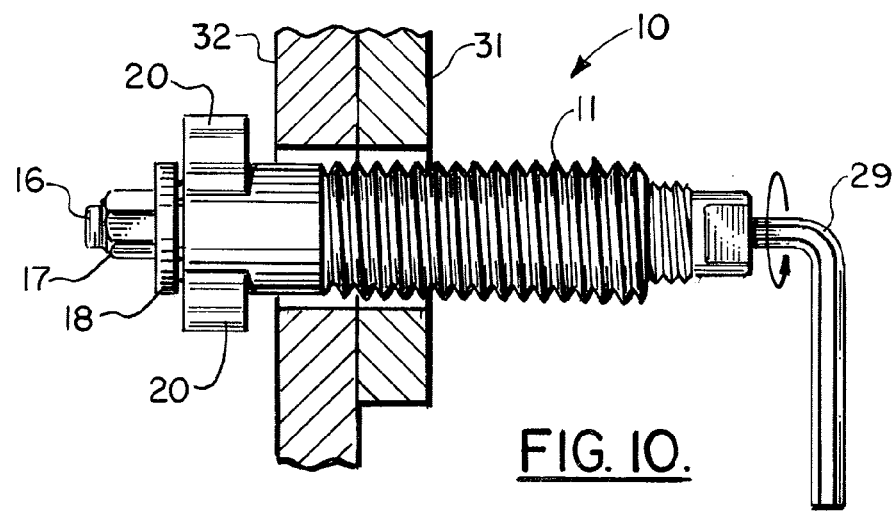
Figure 11:
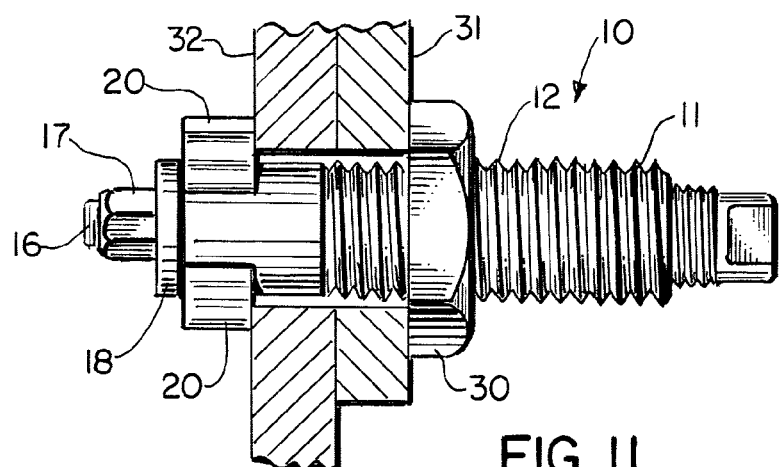

After the body 11 passes through both openings 33, 34 as shown in FIG. 9. wrench 29 can be used to move the locking members 20 to the extended position of FIG. 10. In this position, the locking members 20 extend well beyond the diameter of openings 33, 34 as shown in FIG. 10. Nut 30 can then be attached to body 11 at external threads 12. Rotation of nut 30 enables compression to be generated against the panels 31, 32 as the nut 30 is moved closer to the projecting locking members 20 as shown in FIG. 11. The nut 30 is tightened against the projecting locking members 20.

Figure 12:
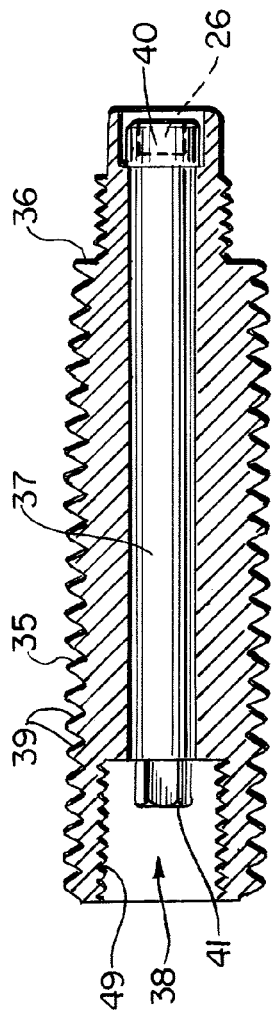
FIG. 12 is a fragmentary view of the preferred embodiment of the apparatus of the present invention illustrating the extension member.
Figure 13:
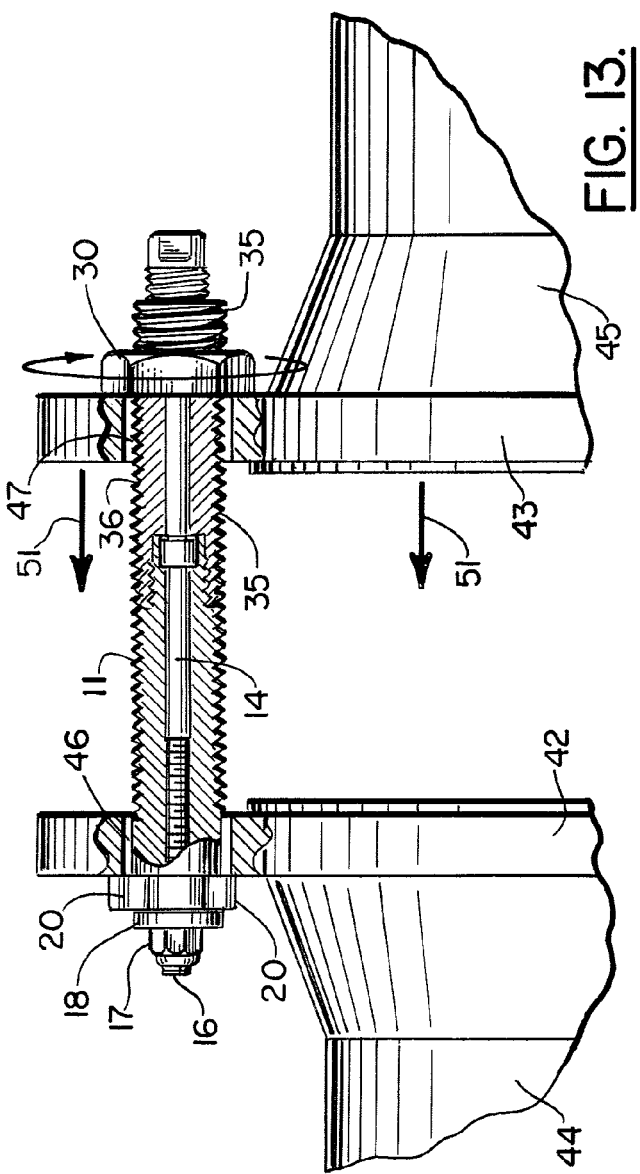
FIG. 13 is a perspective, partially cut away elevation view of the preferred embodiment of the apparatus of the present invention showing it in use with the extension of FIG. 12 and holding two spool pieces together at ring type joint weld neck flanges.

In FIG. 12, an extension 35 is shown that can be added to the body 11 as shown in FIG. 13. Extension 35 has a body 36 with a central longitudinal bore that receives shaft 37. A socket 38 at one end portion of body 36 provides internal threads 49. Body 36 has external threads 39. Shaft 37 has end portion 40 with a tool receptive socket 26 that can be a hexagonal shape such as the socket 26 of shaft 14. End portion 41 of shaft 37 can be a hexagonal projecting portion that engages tool receptive socket 26 of body 11 when extension is to be used. In order to connect extension 35 to body 11, the external threads 28 of body 11 engage the internal threads 49 of extension 35. This connection can be seen in FIG. 13.

In FIG. 13, a pair of spool pieces 44, 45 are to be joined together. Each of the spool pieces 44, 45 provides a pipe flange such as, for example, a ring type joint weld neck flange. The spool piece 44 has flange 42, the spool piece 45 has flange 43. Each of the flanges has bolt openings through which the apparatus 10 of the present invention is inserted for forming a connection. The flange 42 has bolt hole opening 46. The flange 43 has bolt opening 47. As with the illustration in FIGS. 9–11, the combination of body 11 and extension 35 are placed through the openings 46, 47 as shown in FIG. 13. A wrench 29 has then used to rotate shaft 37 which is connected to shaft 14 and also rotates it. In this fashion, the projecting locking members 20 can be moved to the extended position so that they extend well beyond the diameter of bolt hole opening 46 as shown in FIG. 13. Nut 30 can then be added to the external threads 39 of extension 35 as shown in FIG. 13 and tightened for pulling the flanged spool pieces 44, 45 together as indicated schematically by arrows 51 in FIG. 13. The present invention can be used to join structures, such as spool pieces together in crowded areas (eg. oil platforms, refineries) wherein access to each flange may be limited making conventional tools useless.

Figure 21:
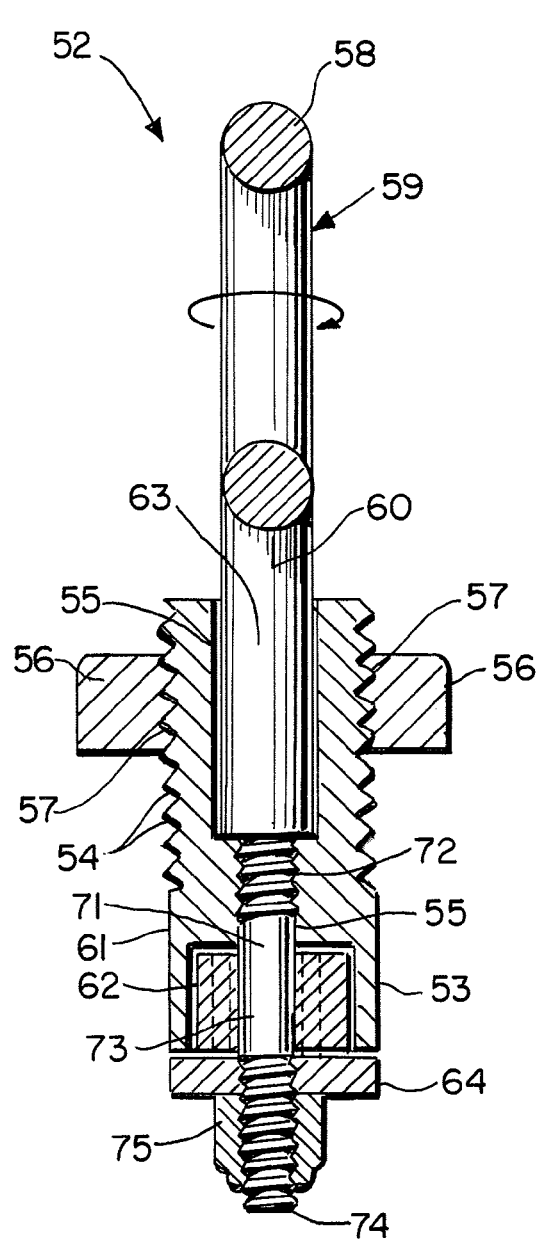
FIG. 21 is a sectional view taken along lines 21—21 of FIG. 17.

In FIGS. 14–25, fastener apparatus 52 includes a body 53 having external threads 54. An open ended bore 55 extends through body 53 as shown in FIG. 21. Nut 56 has internal threads 57 that attach to threads 54 as shown in FIGS. 17, 20 and 21. Shaft 60 includes an eyelet 58 having eyelet opening 59. Body 53 has an unthreaded section 61 that contains socket 62. Socket 62 is downwardly extended as shown in FIG. 21.

Shaft 60 can be integral with eyelet 58 as shown in FIGS. 17 and 21. Shaft 60 includes a larger diameter shaft section 63 and a smaller diameter shaft section 71. The smaller diameter shaft section 71 includes threaded sections 72, 74. The smaller diameter shaft section 71 also includes unthreaded section 73. Bore 55 is configured to closely conform to shaft 60.

Figure 22:
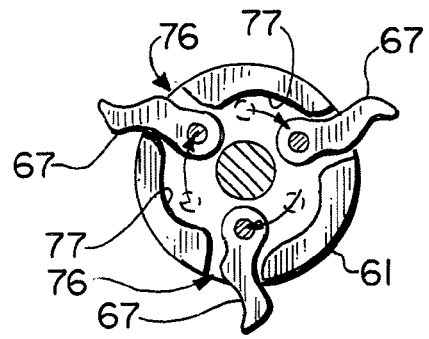
FIG. 22 is a fragmentary sectional view of the alternate embodiment of the apparatus of the present invention.
Figure 23:
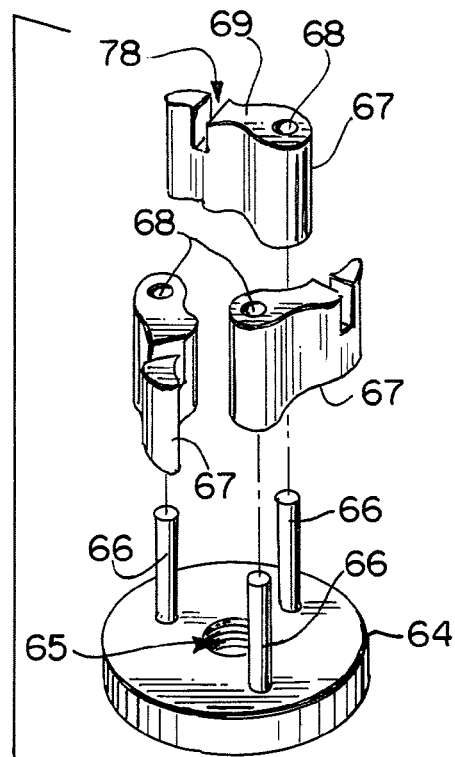
FIG. 23 is a fragmentary perspective view of the alternate embodiment of the apparatus of the present invention.

Disk 64 has internal threads and attaches to the external threads of threaded section 74 of shaft 60 at the smaller diameter shaft section 71. Disk 64 can be held in position using lock nut 75. Disk 64 thus provides an internally threaded opening 65 that engage the external threaded section 74 of shaft 60. Disk 64 carries a plurality (for example, 2–3) pegs 66. Each peg 66 carries a locking member 67 as shown in FIGS. 22 and 23. The locking members 67 are each provided with a pivot hole 68 enabling each locking member 67 to mount upon a peg 66 as shown in FIGS. 19, 22, 23. Each locking member 68 has an upper surface 69 and a lower surface 70. A slot 78 is provided at surface 69 as shown in FIGS. 22–23. Unthreaded section 61 of body 53 provides a plurality of radially extending opening 76 such as the three radially extending openings shown in FIGS. 19 and 22. Camming surfaces 77 can be provided on unthreaded section 61 of body 55 as shown in FIGS. 19 and 20.

Figure 14:
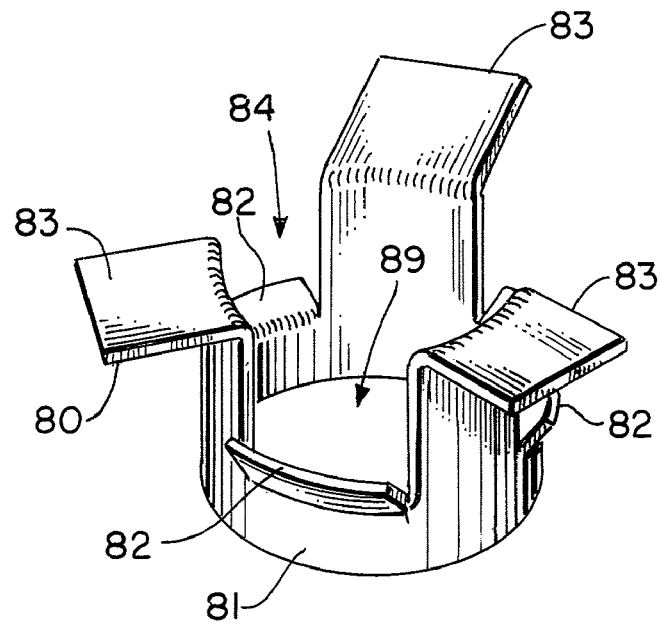
FIG. 14 is a fragmentary perspective view illustrating an insert that can be used with an alternate embodiment of the apparatus of the present invention.
Figure 15:
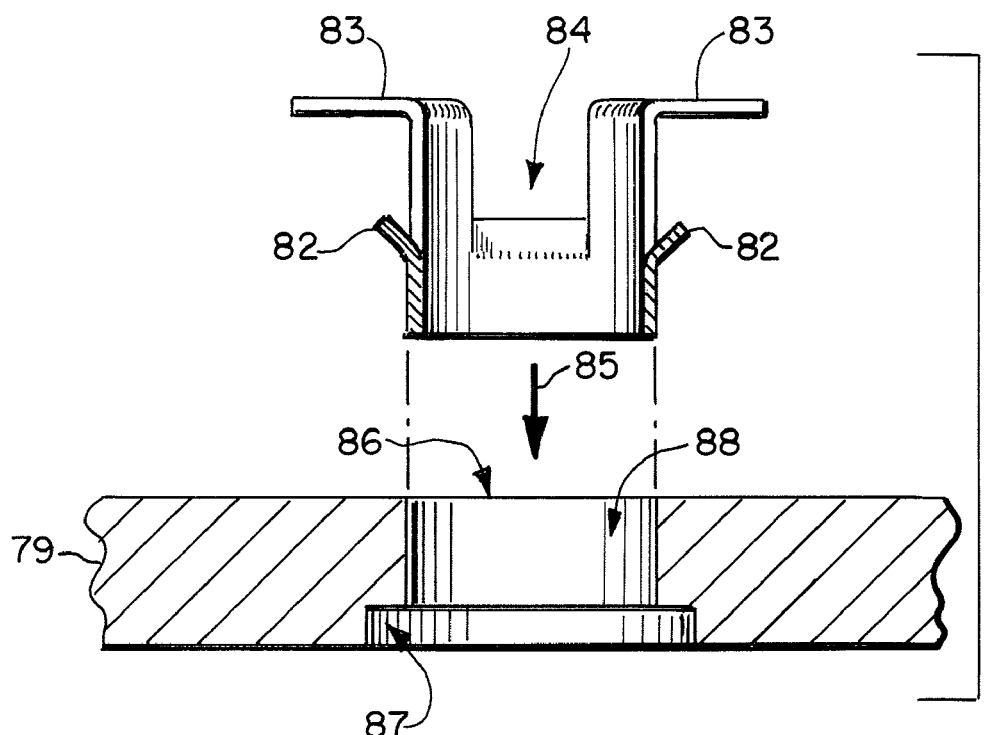
FIG. 15 is a sectional view of the insert of FIG. 14.

Fastener apparatus 52 can be attached to a section of plate 79 (or multiple plates) alone or in combination with the insert 80 that is shown in FIGS. 14, 15, 16. Insert 80 is comprised of a cylindrically shaped wall portion 81 and a plurality of tabs 82, 83.

The tabs 82 are lower, radially extending, inclined tabs as shown in FIGS. 14–16. Tabs 83 are radially extending, generally perpendicular tabs that are parallel with the upper surface of plate 79 as shown in FIG. 16. A slot 84 is provided above each of the diagonally extending tabs 82. To install insert 80, an opening 86 is formed in a section of plate 79. The opening 86 preferably includes a larger diameter section 87 and a smaller diameter section 88. Insert 80 is then pushed into opening 86 from the top as indicated by arrow 85 in FIG. 15.

In FIG. 16, insert 80 is in its operating position mounted in opening 86 in plate 79. To complete a connection of fastener apparatus 52 to plate section 79, a user inserts the fastener apparatus 52 into the open center 89 of insert 80 when the locking members 67 are in the retracted position of FIG. 17. Locking members 67 are then moved to the extended position of FIG. 24 by rotating eyelet 58 as indicated schematically by curved arrow 90 in FIG. 24. Arrows 91 schematically illustrate the deployment of locking members 67 to the extended position. When in the extended position of FIG. 24, the cylindrically shaped portion 81 of insert 80 aligns with the slots 78 of the locking members 67 as indicated in FIG. 24. Nut 56 is then tightened pulling the extended locking members 67 upwardly until they contact the lower surface 92 of plate section 79. At the same time, nut 56 engages the upper tabs 83 of insert 80. In this position, the cylindrically shaped wall portion 81 of insert 80 prevents movement of the locking member 67 to the retracted position of FIG. 17. The cylindrical wall portion 81 occupies the slots 78 in the locking member 67.

Figure 26:
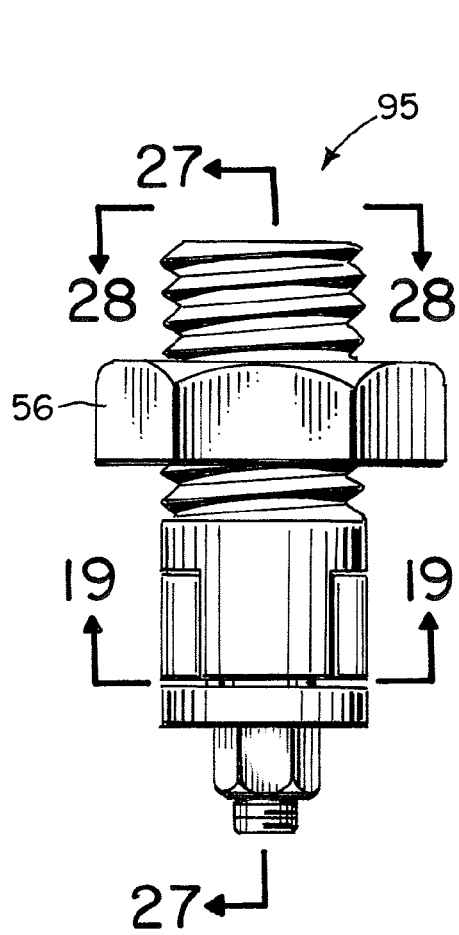
FIG. 26 is an elevation view of an additional alternate embodiment of the apparatus of the present invention.
Figure 27:
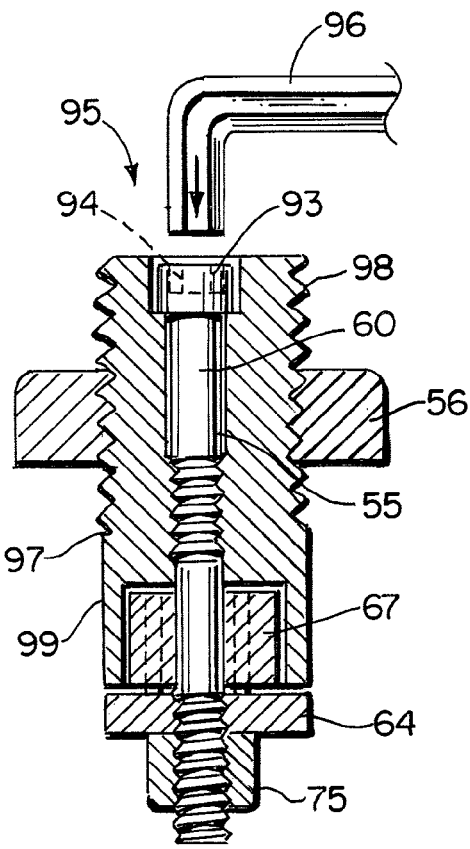
FIG. 27 is a sectional view taken along lines 27—27 of FIG. 26.
Figure 28:
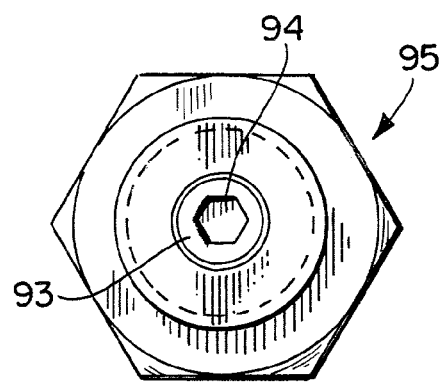
FIG. 28 is an end view taken along lines 28—28 of FIG. 26.
Figure 29:
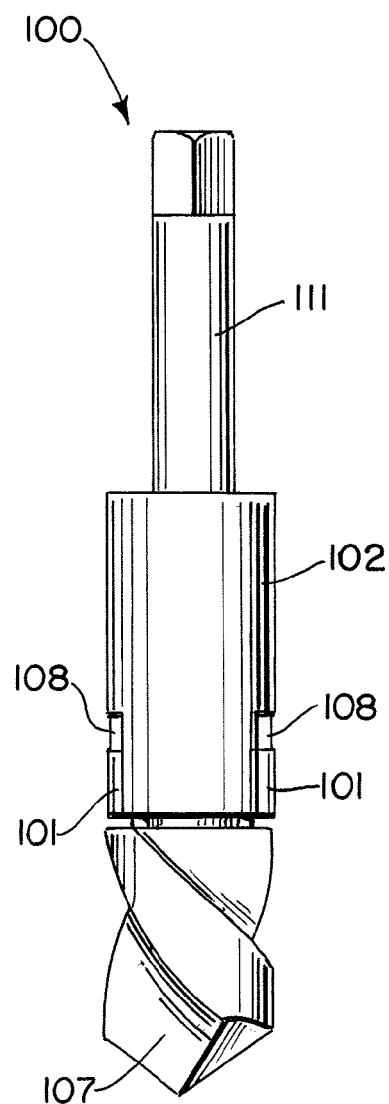
FIG. 29 is an alternate view of another embodiment of the apparatus of the present invention.
Figure 30:
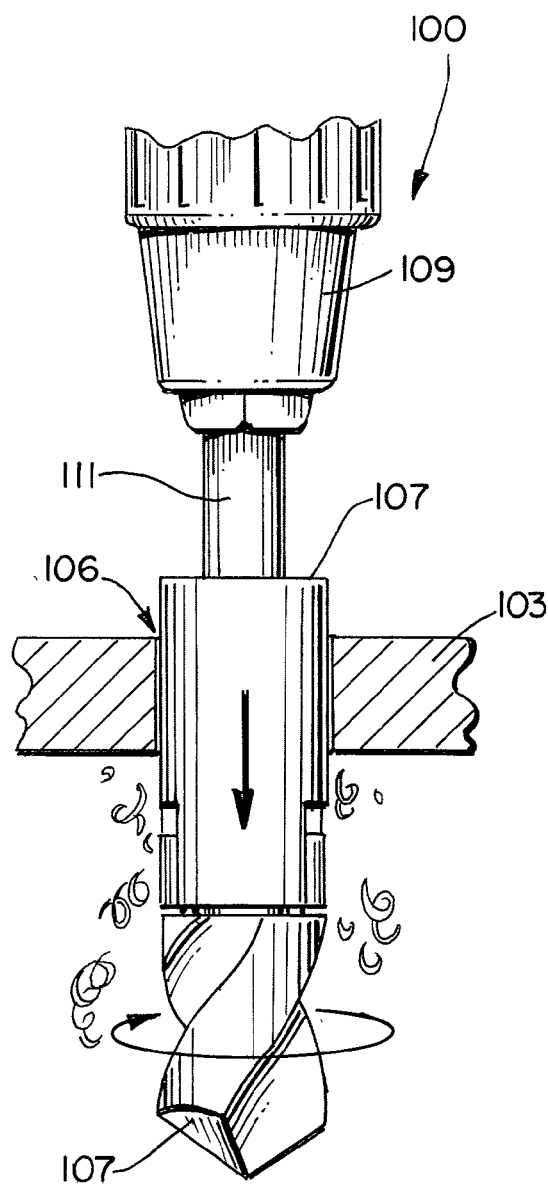
FIG. 30 is an alternate view of another embodiment of the apparatus of the present invention.
Figure 39:
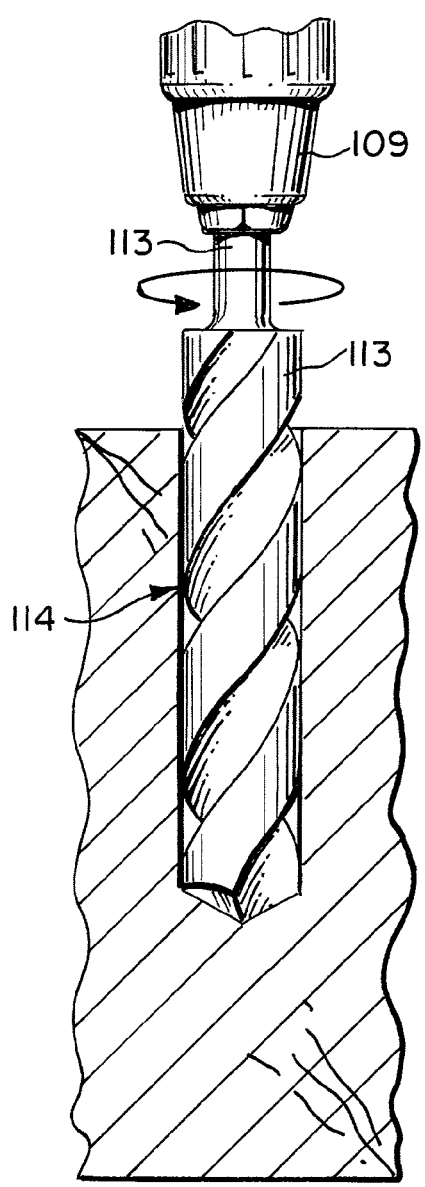
FIG. 39 is a partial sectional elevation view of another embodiment of the apparatus of the present invention.

FIGS. 26–28 show an alternate construction for a fastener apparatus, designated generally by the numeral 95. In the embodiment of FIGS. 26–28, the fastener apparatus 95 employs the same locking members 67, disk 64, pegs 66 as with the embodiment of FIGS. 17–25. The embodiment of FIGS. 26–28 employs the same basic shaft 60 configuration and open-ended bore 55. In FIGS. 26–28 however, the shaft 60 has a head 93 with a tool receptive socket 94 to which a wrench, such as an Allen wrench, can be attached as shown in FIG. 27. The fastener apparatus 95 thus provides a body 97 having an upper externally threaded portion 98 and a lower unthreaded portion 99. Nut 56 attaches to the externally threaded portion 98.

FIGS. 29–33 shows a drill mechanism 100 that employs projecting members 101 that extend from body 102 using the same mechanism as either of the fastener apparatus 52, 95 of FIGS. 17–28. The drill mechanism 100 of FIGS. 29–33 is used to form an opening 104 in plate section 103, wherein the opening 104 has larger diameter cylindrically shaped section 105 and smaller diameter cylindrically shaped section 106.

The lower end portion of body 102 provides a drill bit portion 107 that cuts the smaller diameter cylindrically shaped portion 106 of opening 104. The projecting members 101 carry blades 108 that cut the larger diameter section 105 of opening 104. The larger diameter section 105 is cut when a user operating the drill motor 109 pulls upwardly in the direction of arrow 110 in FIG. 32. Drill motor 109 attaches to drill mechanism 100 at upper shaft portion 111.

Figure 40:
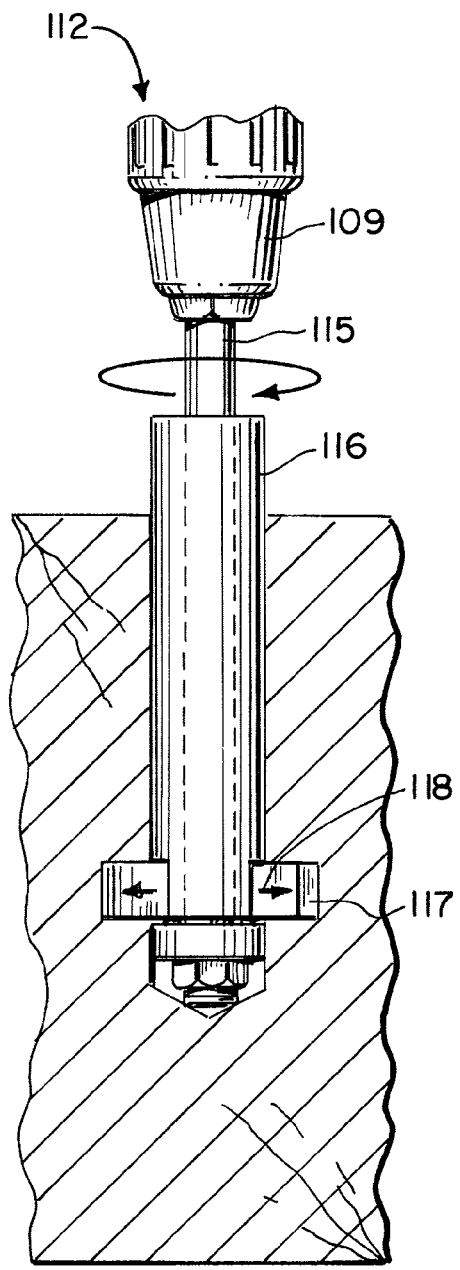
FIG. 40 is a partial sectional elevation view of another embodiment of the apparatus of the present invention.

Another drill mechanism is shown in FIGS. 39–42, designated generally by the numeral 112. The drill mechanism 112 provides a drill bit 113 that can be attached to drill motor 109. The drill 113 is a common commercially available drill bit that cuts a first opening 114. In FIG. 40, drill mechanism 112 includes a shaft 115 attached to body 116. The lower end portion of body 116 provides projecting portions 117 that have cutting blades that can be opened in the direction of arrow 118 using the same mechanism that operates the locking members of the fasteners 52, 95 of FIGS. 17–28. Thus the drill mechanism 112 provides a body 116 that employs a lower disk 119 like the disk 64 discussed above with lock nut 120 like the like nut 75 in FIGS. 20, 24 and 25. Thus the embodiment of FIGS. 40–42 includes the mechanism shown for example in FIGS. 17–25 for moving the projecting members/blades 117 from a retracted to an expanded position. In FIG. 41, the completed opening 121 is shown including smaller diameter cylindrically shaped portion 122 and larger diameter cylindrically shaped portion 123. Fastener 52 can be attached to this opening as shown in FIG. 42.

Another embodiment of the apparatus of the present invention is shown in FIGS. 34–38. The embodiment of FIGS. 34–38 can be used to replace a common bolted connection that is used in liquid holding vessels or tanks to fasten plate sections together in creating a tank or vessel wall. The alternate embodiment of FIGS. 34–38 thus provides a fluid transfer fastener, designated generally by the numeral 124 in FIGS. 36, 37 and 38. Fluid transfer fastener 124 replaces a bolted connection that is shown in FIGS. 34 and 35. The bolted connection includes a bolt 127 and a nut 128 that are disassembled as shown in FIG. 35. Upon removal of the bolt 127 and nut 128, opening 129 is shown extending through plate sections 125, 126. The plate sections 125, 126 are schematic illustrations of plate sections that might be part of a vessel wall, the vessel containing a fluid to be removed via fluid transfer fastener 124 for sampling purposes, as an example. In an emergency, fastener 124 could be used to plug a hole, under pressure or not.

The plate sections 125, 126 are thus schematically shown as part of a tank wall 130 of a vessel. After removal of the bolt 127 and nut 128, fluid transfer fastener 124 is inserted through opening 129 as indicated by arrow 131 in FIG. 36. The fluid transfer fastener 124 is constructed in similar fashion to the embodiments of FIGS. 17–33 with the exception that the shaft used to extend and retract the locking members is of a tubular shape. Tubular shaft 132 provides a flow bore 133. Disk 136 has a cylindrically shaped opening 145 that conforms to the outer surface 137 of tubular shaft 132. Set screw 138 is used to secure disk 136 to the outer surface 137 of tubular shaft 132.

Tubular shaft 132 is mounted in central open ended bore 146 of body 140. The body 140 has an upper end portion 141 and a lower end portion 142. The upper end portion 141 is threaded while the lower end portion 142 is unthreaded as shown in FIG. 37. As with the embodiments of FIGS. 17–33, radially extending openings 144 are provided in lower end portion 142 for enabling locking members 139 to be moved between the retracted position of FIG. 37 and the extended position of FIG. 38. Arrow 147 in FIG. 37 is a curved arrow that schematically illustrates rotation of the tubular shaft 132 to initiate movement of the locking members 139 to the extended position.

Movement of the locking members 139 is schematically illustrated in FIGS. 37 and 38 with arrows 148. Once in the extended position, a lock nut can be tightened to close the distance between the lock nut 149 and the extended locking members 139 as shown in FIG. 38, clamping the plate sections 125, 126 therebetween. A valve 134 and flowline 135 can be attached to tubular shaft 132. When the valve is opened, fluid can be withdrawn from the tank through the opening 129 in the tank wall 130 for sampling purposes as an example.

The following is a list of parts and materials suitable for use in the present invention.

| PARTS LIST | |
|---|---|
| Part Number | Description |
| 10 | fastener apparatus |
| 11 | body |
| 12 | external threads |
| 13 | central longitudinal bore |
| 14 | shaft |
| 15 | external threads |
| 16 | threaded end portion |
| 17 | locking nut |
| 18 | circular rotating plate |
| 19 | opening |
| 20 | locking member |
| 21 | locking member pivot hole |
| 22 | peg |
| 23 | slot |
| 24 | socket |
| 25 | cam surface |
| 25A | cam surface |
| 26 | tool socket |
| 27 | end portion |
| 28 | external threads |
| 29 | wrench |
| 30 | nut |
| 31 | first member |
| 32 | second member |
| 33 | opening |

-continued

PARTS LIST

| Part Number | Description |
|---|---|
| 34 | opening |
| 35 | extension |
| 36 | body |
| 37 | shaft |
| 38 | socket |
| 39 | external threads |
| 40 | end portion |
| 41 | end portion |
| 42 | pipe flange |
| 43 | pipe flange |
| 44 | spool piece |
| 45 | spool piece |
| 46 | bolt hole |
| 47 | bolt hole |
| 48 | arrow |
| 49 | internal threads |
| 50 | external threads |
| 51 | arrow |
| 52 | fastener apparatus |
| 53 | body |
| 54 | external threads |
| 55 | open ended bore |
| 56 | nut |
| 57 | internal threads |
| 58 | eyelet |
| 59 | opening |
| 60 | shaft |
| 61 | unthreaded section |
| 62 | socket |
| 63 | large diameter shaft section |
| 64 | disk |
| 65 | internally threaded opening |
| 66 | peg |
| 67 | locking member |
| 68 | pivot hole |
| 69 | upper surface |
| 70 | lower surface |
| 71 | smaller diameter shaft section |
| 72 | threaded section |
| 73 | unthreaded section |
| 74 | threaded section |
| 75 | lock nut |
| 76 | radially extending opening |
| 77 | camming surface |
| 78 | slot |
| 79 | plate |
| 80 | insert |
| 81 | cylindrically shaped wall |
| 82 | tab |
| 83 | tab |
| 84 | slot |
| 85 | arrow |
| 86 | opening |
| 87 | larger diameter section |
| 88 | smaller diameter section |
| 89 | open center |
| 90 | arrow |
| 91 | arrow |
| 92 | lower surface |
| 93 | head |
| 94 | tool receptive socket |
| 95 | fastener apparatus |
| 96 | wrench |
| 97 | body |
| 98 | threaded section |
| 99 | unthreaded section |
| 100 | drill mechanism |
| 101 | projecting member |
| 102 | body |
| 103 | plate section |
| 104 | opening |
| 105 | larger diameter section |
| 106 | smaller diameter section |
| 107 | drill bit section |
| 108 | blade |

-continued

PARTS LIST

| Part Number | Description |
|---|---|
| 109 | motor |
| 110 | arrow |
| 111 | shaft |
| 112 | drill mechanism |
| 113 | drill bit |
| 114 | opening |
| 115 | shaft |
| 116 | body |
| 117 | blade |
| 118 | arrow |
| 119 | disk |
| 120 | lock nut |
| 121 | opening |
| 122 | smaller diameter section |
| 123 | larger diameter section |
| 124 | fluid transfer fastener |
| 125 | plate section |
| 126 | plate section |
| 127 | bolt |
| 128 | nut |
| 129 | opening |
| 130 | tank wall |
| 131 | arrow |
| 132 | tubular shaft |
| 133 | flow bore |
| 134 | valve |
| 135 | flow line |
| 136 | disk |
| 137 | outer surface |
| 138 | set screw |
| 139 | locking member |
| 140 | body |
| 141 | upper end portion |
| 142 | lower end portion |
| 143 | threaded section |
| 144 | radically extending opening |
| 145 | opening |
| 146 | bore |
| 147 | arrow |
| 148 | arrow |
| 149 | nut |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A fastener apparatus comprising;
 a) an elongated body having first and second end portions and a central, longitudinal bore that is at least partially threaded, the first end portion of the body having a socket and a plurality of circumferentially spaced apart slots that communicate with the socket;
 b) a shaft that extends through the bore and having respective first and second end portions communicating with the body end portions, the shaft being at least partially externally threaded and rotatable relative to the body;
 c) a plate that is attached to the first end portion of the shaft;
 d) a plurality of locking members that are movably attached to the plate at the first end portion of the body;
 e) the locking members being rotatable: 1) relative to the plate and 2) about the shaft when the locking members move between the extended and retracted positions the locking members extending radially beyond the outer surface of the body in the extended position and being contained within the body at the socket in the retracted position; and f) a nut that is connectable to the body with a threaded connection.

2. The fastener apparatus of claim 1 wherein there are at least three locking members.

3. The fastener apparatus of claim 1 wherein the locking members have curved outer surfaces.

4. The fastener apparatus of claim 1 wherein the body has curved camming surfaces at the socket that are positioned to guide movement of the locking members as they travel between the extended and retracted positions.

5. The fastener apparatus of claim 1, wherein the locking members are pivotally mounted on the plate.

6. The fastener apparatus of claim 5 wherein the shaft has a first threaded portion that connects with the plate and a second threaded portion that engages the body.

7. The fastener apparatus of claim 1 wherein the shaft has a tool receptive portion at one end thereof that enables rotation of the shaft relative to the body.

8. The fastener apparatus of claim 1 wherein the nut engages the body generally opposite the locking members.

9. The fastener apparatus of claim 1 wherein the shaft moves linearly relative to the central longitudinal axis of the body when the shaft is rotated.

10. A fastener apparatus for joining two members together, each member having an opening therethrough of a selected diameter, comprising;

a) an elongated body having first and second end portions and a central, longitudinal bore that is partially threaded, the first end portion of the body having a socket and a plurality of circumferentially spaced apart, radially extending slots that communicate with the socket;

b) a shaft that extends through the bore and having respective first and second end portions communicating with the body end portions, the shaft being partially externally threaded and rotatable relative to the body, the partially externally threaded portion of the shaft engaging the threaded portion of the bore;

c) a plate that is attached to the first end portion of the shaft;

d) a plurality of locking members that are attached to the shaft at the first end portion of the body, the locking members being attached to a plate mounted to the first end portion of the shaft;

e) the locking members being rotatable: 1) relative to the plate and 2) about the shaft when the locking members move between extended and retracted positions responsive to a rotation of the shaft, the locking members extending radially beyond the outer surface of the body and the selected diameter in the extended position and being contained within the body at the socket and inside the selected diameter in the retracted position; and f) a nut that is connectable to the body at the partially threaded portion.

11. The fastener apparatus of claim 10 wherein there are at least three locking members.

12. The fastener apparatus of claim 10 wherein the locking members each have a curved outer surface.

13. The fastener apparatus of claim 10 wherein the body has curved camming surfaces on the socket that are positioned to guide movement of the locking members as they travel between the extended and retracted positions.

14. The fastener apparatus of claim 10, wherein the locking members are pivotally mounted on the plate.

15. The fastener apparatus of claim 14 wherein the shaft has a first threaded portion that connects with the plate and a second threaded portion that engages the body.

16. The fastener apparatus of claim 10 wherein the shaft has a tool receptive portion at one end thereof that enables rotation of the shaft relative to the body.

17. The fastener apparatus of claim 10 wherein the nut engages the body generally opposite the locking members.

18. The fastener apparatus of claim 10 wherein the shaft moves linearly relative to the central longitudinal axis of the body when the shaft is rotated.

19. A fastener apparatus comprising;

a) an elongated body having first and second end portions and a central, longitudinal bore the first end portion of the body having a socket and a plurality of circumferentially spaced apart slots that communicate with the socket the second end portion being externally threaded;

b) a shaft that extends through the bore and having respective first and second end portions communicating with the body end portions, the shaft being rotatable relative to the body;

c) a plate that is attached to the first end portion of the shaft;

d) a plurality of locking members that are attached to the plate at the first end portion of the body, the locking members being attached to the first end portion of the shaft;

e) the locking members being rotatable: 1) relative to the plate and 2) about the shaft when the locking members move between extended and retracted positions responsive to a rotation of the shaft, the locking members extending radially beyond the outer surface of the body in the extended position and being contained within the body at the socket in the retracted position; and f) a nut that is connectable to the body at the partially threaded portion.

20. The fastener apparatus of claim 19 wherein there are at least three locking members.

21. The fastener apparatus of claim 19 wherein the locking members have curved outer surfaces.

22. The fastener apparatus of claim 19 wherein the body has curved camming surfaces at the socket that are positioned to guide movement of the locking members as they travel between the extended and retracted positions.

23. The fastener apparatus of claim 19, wherein the locking members are pivotally mounted on the plate.

24. The fastener apparatus of claim 23 wherein the shaft has a first threaded portion that connects with the plate and a second threaded portion that engages the body at an internally threaded portion of the bore.

25. The fastener apparatus of claim 19 wherein the shaft has a tool receptive portion at one end thereof that enables rotation of the shaft relative to the body.

26. The fastener apparatus of claim 19 wherein the nut engages the body generally opposite the locking members.

27. The fastener apparatus of claim 19 wherein the shaft moves linearly relative to the central longitudinal axis of the body when the shaft is rotated.

28. A fastener apparatus for joining two members together, each member having an opening therethrough of a selected diameter, comprising;

a) an elongated body having first and second end portions and a central, longitudinal bore that is partially threaded, the first end portion of the body having a socket and a plurality of circumferentially spaced apart, radially extending slots that communicate with the socket;

b) a shaft that extends through the bore and having respective first and second end portions communicating with the body end portions, the shaft being partially externally threaded and rotatable relative to the body, the partially externally threaded portion of the shaft engaging the threaded portion of the bore;

c) a plurality of locking members that are attached to the shaft at the first end portion of the body, the locking members being movably attached respectively to pegs on a plate that is mounted to the first end portion of the shaft;

d) the locking members being movable between extended and retracted positions responsive to a rotation of the shaft, the locking members extending radially beyond the outer surface of the body and the selected diameter in the extended position and being contained within the body at the socket and inside the selected diameter in the retracted position; and e) a nut that is connectable to the body at the partially threaded portion.

29. The fastener apparatus of claim 28 wherein there are at least three locking members.

30. The fastener apparatus of claim 28 wherein each of the locking members has a curved outer surfaces.

31. The fastener apparatus of claim 28 wherein the body has curved camming surfaces at the socket that are positioned to guide movement of the locking members as they travel between the extended and retracted positions.

32. The fastener apparatus of claim 28, further comprising a plate attached to the shaft, the locking members being mounted on the plate.

33. The fastener apparatus of claim 32 wherein the shaft has a first threaded portion that connects with the plate and a second threaded portion that engages the body.

34. The fastener apparatus of claim 28 wherein the shaft has a tool receptive portion at one end thereof that enables rotation of the shaft relative to the body.

35. The fastener apparatus of claim 28 wherein the nut engages the body generally opposite the locking members.

36. The fastener apparatus of claim 28 wherein the shaft moves linearly relative to the central longitudinal axis of the body when the shaft is rotated.

37. The fastener apparatus of claim 1 wherein one end portion of the shaft is an eyelet.

38. The fastener apparatus of claim 10 wherein one end portion of the shaft is an eyelet.

39. The fastener apparatus of claim 19 wherein one end portion of the shaft is an eyelet.

40. The fastener apparatus of claim 28 wherein one end portion of the shaft is an eyelet.

41. The fastener apparatus of claim 37 wherein the eyelet is positioned opposite the plate.

42. The fastener apparatus of claim 38 wherein the eyelet is positioned opposite the plate.

43. The fastener apparatus of claim 39 wherein the eyelet is positioned opposite the plate.

44. The fastener apparatus of claim 40 wherein the eyelet is positioned opposite the plate.

* * * * *